United States Patent [19]

Maekawa et al.

[11] Patent Number: 5,079,092
[45] Date of Patent: Jan. 7, 1992

[54] PLATE-LIKE COMPOSITE FERRITE FINE PARTICLES SUITABLE FOR USE IN MAGNETIC RECORDING AND PROCESS FOR PRODUCING THE SAME

[75] Inventors: Masaaki Maekawa; Norimichi Nagai; Norio Sugita, all of Hiroshima, Japan

[73] Assignee: Toda Kogyo Corp., Hiroshima, Japan

[21] Appl. No.: 556,697

[22] Filed: Jul. 24, 1990

Related U.S. Application Data

[63] Continuation-in-part of Ser. No. 368,678, Jun. 20, 1989, abandoned.

[30] Foreign Application Priority Data

Jun. 28, 1988 [JP]  Japan .................................. 63-161777
May 10, 1989 [JP]  Japan .................................. 1-119743

[51] Int. Cl.$^5$ ................................................ B32B 5/16
[52] U.S. Cl. ................................ 428/403; 252/62.59;
252/62.62; 252/62.63; 252/62.64; 427/127;
427/128; 427/130; 428/402; 428/694
[58] Field of Search ................ 252/62.59, 62.62, 62.63,
252/62.64; 428/402, 403, 694; 427/127-130

[56] References Cited

U.S. PATENT DOCUMENTS 4,851,292  7/1989  Nagai et al. .................... 252/62.59

FOREIGN PATENT DOCUMENTS

| A145229 | of 1985 | European Pat. Off. | |
| 272148 | 6/1988 | European Pat. Off. | 252/62.59 |
| 62-139121 | 6/1987 | Japan | 252/62.63 |
| 62-139123 | 6/1987 | Japan | 252/62.63 |

*Primary Examiner*—Jack Cooper
*Attorney, Agent, or Firm*—Nixon & Vanderhye

[57] ABSTRACT

Disclosed herein are plate-like composite ferrite fine particles for magnetic recording comprising plate-like composite ferrite containing Ba fine particles which contain Ti of 2 to 5.0 atomic % based on $Fe^{3+}$ and Ni in the range of $1.2 \leq Ni/Ti \leq 4$ by molar ratio, which have zinc in the vicinity of the particles surfaces in the form of a solid solution, which have an average particle diameter of 0.01 $\mu$m to 0.08 $\mu$m, and the coercive force of which scarcely varies with the rise in temperature in the temperature range of $-20°$ C. to $120°$ C., and a process for producing such plate-like composite ferrite fine particles.

8 Claims, 3 Drawing Sheets

(× 100000)

(× 100000)

(× 100000)

(× 100000)

PLATE-LIKE COMPOSITE FERRITE FINE PARTICLES SUITABLE FOR USE IN MAGNETIC RECORDING AND PROCESS FOR PRODUCING THE SAME

CROSS-REFERENCE TO RELATED APPLICATION

The present application is a continuation-in-part of application Ser. No. 07/368,678 filed June 20, 1989 now abandoned.

BACKGROUND OF THE INVENTION

The present invention relates to plate-like composite ferrite fine particles for magnetic recording which have a large magnetization, an appropriate coersive force, a large anisotropy field, a particle size of less than 0.1 μm and an excellent temperature stability, and a process for producing such plate-like composite ferrite fine particles.

As described, for example, in Japanese Patent Application Laid-Open (KOKAI) No. 55-86103 (1980), ferromagnetic non-acicular particles have recently been demanded as a magnetic recording material, in particular, as a perpendicular magnetic recording material.

Generally, plate-like ferrite containing Ba particles are known as ferromagnetic non-acicular particles.

A method of autoclaving an aqueous alkaline suspension containing Ba ions and $Fe^{3+}$ by using an autoclave as a reaction apparatus (this method is hereinunder referred to as "autoclaving method") is hitherto known as a process for producing plate-like ferrite.

Plate-like ferrite fine particles for magnetic recording are required to have as small a particle size as possible, to have an appropriate coercive force, a large magnetization and a large anisotropy field as the magnetic properties, and to be so excellent in the temperature dependence of the coercive force(temperature stability)-scarcely varies or has a tendency to lower with the rise of temperature. This will be explained in more detail in the following.

Firstly, the particle size of plate-like ferrite fine particles must be as small as possible, as is seen from FIG. 3 on page 27, lines 23 to 29 in the REPORTS OF TECHNICAL RESEARCHES OF THE INSTITUTE OF ELECTRONICS AND COMMUNICATION ENGINEERS OF JAPAN MR 81-11. FIG. 3 shows the relationship between the particle size of Co-doped acicular maghemite particles and the noise level, and it is clear from FIG. 3 that the particle size becomes smaller, the more the noise level linearly lowers. This relationship also holds for plate-like ferrite containing Ba particles.

Secondly, with respect to the magnetic properties, the plate-like ferrite containing Ba fine particles are generally required to have a coercive force of about 300 to 2,500 Oe, and in order to reduce the coercive force of the plate-like ferrite containing Ba particles produced in the autoclaving method to an appropriate coercive force, a method of substituting a part of $Fe^{3+}$ in the ferrite by $Co^{2+}$, $Ti^{4+}$ or the ions of a divalent metal $M^{2+}$ such as Mn and Zn has been proposed.

The magnetization of plate-like ferrite containing Ba particles must be as large as possible, as is described in Japanese Patent Application Laid-Open (KOKAI) No. 56-149328 (1981), "... the magneto plumbite ferrite which is used as a magnetic recording material is required to have the greatest possible saturation magnetization..."

The coercive force of plate-like ferrite containing Ba particles generally has a tendency of increasing with the rise of temperature, as is seen from FIG. 4 on page 1123 of IEEE TRANSACTIONS ON MAGNETICS MAG-18 No. 6. At the time of recording and reproduction, the temperatures of a magnetic head and a magnetic medium are raised with the reciprocal friction, so that the writing capacity for recording of the magnetic head is lowered, while the coercive force of the medium containing the plate-like ferrite containing Ba particles as magnetic particles is increased with the rise of temperature, resulting in the drop of output or deterioration of the overwrite characteristic. It is therefore necessary in order to enable record-writing in spite of the lowered writing capacity of the magnetic head that the coercive force of the medium scarcely varies or rather has a tendency to lower with the rise of temperature. Namely, it is necessary that the coercive force of plate-like ferrite containing Ba particles scarcely varies or rather has a tendency to lower with the rise of temperature. It is also pointed out, however, that the lowering of the coercive force more than necessary, is unfavorable from the point of view of recording stability.

Plate-like ferrite containing Ba particles are also required to have a large anisotropy field so as to enable high-density recording without lowering the output even in a high-frequency band. This fact is described, for example, on pages 67 to 68 of HIGH-DENSITY MEMORY TECHNIQUE AND MATERIALS (1984), published by K.K. CMC, "FIGS. 2, 3 and 12 show the characteristics between the output and the wavelength obtained by recording/reproducing with a ring head by using a Co-Cr single-layer medium having a large perpendicular anisotropy field (Hk). An excellent high-density recording characteristic such as $D_{50}=135$ KBPI is obtained ...."

Plate-like ferrite fine particles which have as small a particle size as possible, a large magnetization, an appropriate coercive force, a large anisotropy field and an excellent temperature stability are now in the strongest demand. In the above-described autoclaving method, various kinds of ferrite particles precipitate depending on the selected reaction conditions. The precipitated particles ordinarily have a shape of a hexagonal plate, and the particle properties such as particle size distribution and average particle diameter, and the magnetic properties such as coercive force, magnetization and temperature stability are different depending upon the conditions under which the ferrite particles are produced.

For example, in plate-like composite ferrite fine particles containing $Co^{2+}-Ti^{4+}$ obtained by producing plate-like Ba ferrite fine particles containing $Co^{2+}-Ti^{4+}$ by autoclaving method while substituting a part of $Fe^{3+}$ in the ferrite by $Co^{2+}$ and $Ti^{4+}$ in order to reduce the coercive force to an appropriate coercive force and heat-treating the thus-obtained fine particles, the coercive force reducing-effect of $Co^{2+}-Ti^{4+}$ is large, so that the necessary amount of $Co^{2+}$ and $Ti^{4+}$ added to appropriately control the coercive force is so small as not to greatly lower the magnetization, which is maintained at a comparatively large value such as about 50 to 60 emu/g. However, the temperature dependence of the coercive force is +2.5 Oe/° C. to 6.0 Oe/° C., and the coercive force has a tendency of increasing with the rise of temperature, as described above. This phenomenon is inferred from FIG. 1 on page 1459 of JOURNAL OF MAGNETISM AND MAGNETIC MATERIALS Nos. 15 to 18 (1980).

In the case of the plate-like composite ferrite fine particles containing $Ni^{2+}-Ti^{4+}$ produced by autoclaving method while substituting a part of $Fe^{3+}$ in the ferrite by equimolar $Ni^{2+}$ and $Ti^{4+}$ in order to reduce the coercive force to an appropriate coercive force, the particle size is not less than 0.1 μm, and in the plate-like composite ferrite fine particles containing equimolar $Ni^{2+}-Ti^{4+}$ obtained by heat-treating the thus obtained fine particles, the coercive force reducing-effect of $Ni^{2+}-Ti^{4+}$ is so small that a large amount of $Ni^{2+}$ and $Ti^{4+}$ must be added for appropriate control of the coercive force, thereby reducing the magnetization to as low as about 47 emu/g at most. The temperature dependence of the coercive force is comparatively superior to that of the plate-like ferrite fine particles containing $Co^{2+}-Ti^{4+}$, as inferred from FIG. 1 on page 1459 of JOURNAL OF MAGNETISM AND MAGNETIC MATERIALS Nos. 15 to 18 (1980), but the temperature dependence of the coercive force of about 1.0 to 3.0 Oe/°C. cannot still be said to be satisfactory.

As a method of improving the temperature stability of plate-like composite ferrite fine particles containing elements such as $Co^{2+}-Ti^{4+}$ for reducing the coercive force, methods disclosed in, for example, Japanese Patent Application (KOKAI) Laid-Open Nos. 61-152003 (1986) and 62-132732 (1987) are conventionally known.

The method disclosed in Japanese Patent Application (KOKAI) Laid-Open No. 61-152003 (1986) is a method of heat-treating the plate-like composite ferrite fine particles containing elements such as $Co^{2+}-Ti^{4+}$ for reducing the coercive force at a temperature of 300° to 700° C. in a reducing atmosphere. This method is disadvantageous in that the coercive force after heat-treating is increased to more than double the value before heat-treating, thereby making the appropriate control of the coercive force difficult.

The method disclosed in Japanese Patent Application (KOKAI) Laid-Open No. 62-132732 (1987) in a method of making the particle shapes produced uniform such that the average particle diameter is not more than 1.0 μm, the thickness in the direction of the c-axis is not more than 0.2 μm and a plate ratio (average diameter of plate surfaces/thickness in the direction of c-axis) is not less than 5. This method is disadvantageous in that the particle shape is regulated in order to improve the temperature stability.

As a method of enhancing the magnetization of plate-like composite ferrite containing Ba particles, for example, methods of modifying the surfaces of the plate-like composite ferrite containing Ba particles by spinel ferrite (disclosed in Japanese Patent Application Laid-Open (KOKAI) Nos. 60-255628 (1985), 60-255629 (1985), 62-139121 (1987), 62-139122 (1987), 62-139123 (1987) and 62-139124 (1987)) is conventionally known. An anisotropy field of the plate-like ferrite fine particles produced by these proposed methods is as small as about 2 to 3 KOe. Further by these proposed methods, it is impossible to obtain well-balanced plate-like ferrite fine particles having an average particle diameter of less than 0.1 μm, a large magnetization, an appropriate coercive force and an excellent temperature stability.

The establishment of a method of producing plate-like Ba ferrite fine particles having as small a particle size as possible, an appropriate coercive force, a large magnetization, a large anisotropy field and an excellent temperature stability without any regulation in the particle shape has therefore been strongly demanded.

As a result of various studies on a process for producing plate-like ferrite particles having as small a particle size as possible, an appropriate coercive force, a large magnetization, a large anisotropy field, and an excellent temperature stability that the coercive force scarcely varies with-the rise of temperature without any regulation in the particle shape, it has been found that by autoclaving a suspension of an alkaline iron (III) hydroxide containing 0.125 to 0.25 atom of Ba ions based on 1 atom of $Fe^{3+}$ in the temperature range of 100° to 300° C., while adding in advance 2 to 5.0 atomic% of a Ti compound based on $Fe^{3+}$ and $1.2 \leq Ni/Ti \leq 4$ by molar ratio of a Ni compound to the suspension of the alkaline iron (III) hydroxide to produce the plate-like composite ferrite containing Ba fine particles, suspending the thus obtained fine particles in an aqueous solution containing zinc and having a pH of 4.0 to 12.0, filtering out the fine particles with a Zn hydroxide precipitated on the surfaces thereof, washing them with water, drying them and calcining (heat-treating) them in the temperature range of 600° to 900° C., the thus obtained plate-like composite ferrite containing Ba particles have a concentration gradient of Zn with a specified percentage through particle in the form of a solid solution, and have an average particle diameter of 0.01 μm to 0.08 μm, an appropriate coercive force, a large magnetization and a large anisotropy field, wherein the coercive force thereof scarcely varies with the rise in temperature in the temperature range of −20° C. to 120° C. The present invention has been achieved on the basis of this finding.

SUMMARY OF THE INVENTION

In a first aspect of the present invention, there is provided plate-like composite ferrite fine particles for magnetic ,recording comprising plate-like composite ferrite containing Ba fine particles which Ti of contain 2 to 5.0 atomic% based on $Fe^{3+}$ and Ni in the range of $1.2 \leq Ni/Ti \leq 4$ by molar ratio, which have zinc in the vicinity of the particles surfaces in the form of a solid solution, which have an average particle diameter of 0.01 μm to 0.08 μm, and an anisotropy field of not less than 3.5 KOe and a coercive force of which scarcely varies with the rise in temperature in the temperature range of −20° C. to 120° C.

In a second aspect of the present invention, there is provided plate-like composite ferrite fine particles for magnetic recording comprising plate-like composite ferrite containing Ba fine particles which contain Ti of 2 to 5.0 atomic% based on $Fe^{3+}$ and Ni in the range of $1.2 \leq Ni/Ti \leq 4$ by molar ratio, which have zinc in the vicinity of the particles surfaces in the form of a solid solution, which have an average particle diameter of 0.01 μm to 0.08 μm and an anisotropy field of not less than 3.5 KOe, and in which the temperature dependence of the coercive force in the temperature range of −20° C. to 120° C. is −0.5 Oe/° C. to +0.5 Oe/° C.

In a third aspect of the present invention, there is provided plate-like composite ferrite fine particles for magnetic recording comprising plate-like composite ferrite containing Ba fine particles which contain Ti of 2 to 5.0 atomic% based on $Fe^{3+}$ and Ni in the range of $1.2 \leq Ni/Ti \leq 4$ by molar ratio, which have zinc in the vicinity of the particles surfaces in the form of a solid solution, the surfaces of which are coated with a spinel type oxide $(M^{2+}{}_xFe^{2+}{}_yO \cdot Fe_2O_3$, wherein $M^{2+}$ represents at least one metal selected from the group consisting of $Co^{2+}$, $Ni^{2+}$, $Mn^{2+}$, $Mg^{2+}$ and $Zn^{2+}$, $0 \leq x \leq 1$, $0 \leq y \leq 1$, $0 < x+y \leq 1$), which have an average particle diameter of 0.01 μm to 0.08 μm and an anisotropy field of not less than 3.5 KOe, and in which the temperature dependence of the coercive force in the temperature range of $-20°$ C. to $120°$ C. is $-3.0$ Oe/° C. to $+0.5$ Oe/° C.

In a fourth aspect of the present invention, there is provided a process for producing plate-like composite ferrite fine particles, comprising the steps of:

autoclaving a suspension of an alkaline iron (III) hydroxide containing 0.125 to 0.25 atom of Ba ions based on 1 atom of $Fe^{3+}$ in the temperature range of 100° to 300° C., while adding in advance 2 to 5.0 atomic% of a Ti compound based on $Fe^{3+}$ and $1.2 \leq Ni/Ti \leq 4$ by molar ratio of an Ni compound to the suspension of the alkaline iron (III) hydroxide so as to produce plate-like composite ferrite containing Ba fine particles having a particle size corresponding to the amount of Ba ions added in the range of an average particle diameter of 0.01 μm to 0.08 μm;

suspending the thus-obtained fine particles in an aqueous solution containing zinc and having a pH of 4.0 to 12.0;

filtering out the particles with a Zn hydroxide precipitated on the surfaces thereof, washing the particles with water;

drying the particles; and heat-treating the particles in the temperature range of 600° to 900° C.

In a fifth aspect of the present invention, there is provided a process for producing plate-like composite ferrite fine particles comprising the steps of:

autoclaving a suspension of an alkaline iron (III) hydroxide containing 0.125 to 0.25 atom of Ba ions based on 1 atom of $Fe^{3+}$ in a temperature range of 100° to 300° C., while adding in advance 2 to 5.0 atomic% of a Ti compound based on Fe (III) and $1.2 \leq Ni/Ti \leq 4$ by molar ratio of an Ni compound to the suspension of the alkaline iron (III) hydroxide so as to produce plate-like composite ferrite containing Ba fine particles having a particle size corresponding to said amount of Ba ions added in the range of an average particle diameter of 0.01 μm to 0.08 μm;

suspending the thus obtained fine particles in an aqueous solution containing zinc and having a pH of 4.0 to 12.0;

filtering out the particles with a Zn hydroxide precipitated on the surfaces thereof, washing the particles with water;

drying the particles;

heat-treating the particles in the temperature range of 600° to 900° C. so as to produce plate-like composite ferrite containing Ba fine particles containing Ti of 2 to 5.0 atomic% based on $Fe^{3+}$ and Ni in the range of $1.2 \leq Ni/Ti \leq 4$ by molar ratio and having zinc in the vicinity of the particles surfaces in the form of a solid solution;

mixing the obtained particles with an alkaline suspension containing an $Fe^{2+}$ salt, at least one metal salt selected from the group consisting of $Co^{2+}$, $Ni^{2+}$, $Mn^{2+}$, $Mg^{2+}$ and $Zn^{2+}$ or both said $Fe^{2+}$ salt and the metal salt in the ratio of 1.0 to 35.0 atomic% based on the total amount of $Fe^{3+}$, Ni and Ti in said particles and having a pH of 8.0 to 14.0; and heat-treating the resultant mixture in the temperature range of 50° to 100° C. so as to coat the surfaces of the particles with a spinel type oxide ($M^{2+}{}_xFe^{2+}{}_yO \cdot Fe_2O_3$, wherein $M^{2+}$ represents at least one metal selected from the group consisting of $Co^{2+}$, $Ni^{2+}$, $Mn^{2+}$, $Mg^{2+}$ and $Zn^{2+}$, $0 \leq x \leq 1$, $0 \leq y \leq 1$, $0 < x+y \leq 1$).

BRIEF DESCRIPTION OF THE DRAWINGS

FIGS. 2 to 5 are electron micrographs ($\times 100,000$) wherein FIGS. 2 to 4 are electron micrographs of the particle structures of the plate-like composite ferrite containing Ba fine particles obtained in Examples 2, 3 and Comparative Example 3, respectively, and FIG. 5 is an electron micrograph of the particle structure of the mixture of the plate-like composite ferrite containing Ba fine particles and cubic $BaTiO_3$ particles obtained in Comparative Example 2.

DETAILED DESCRIPTION OF THE INVENTION

Figure 1:
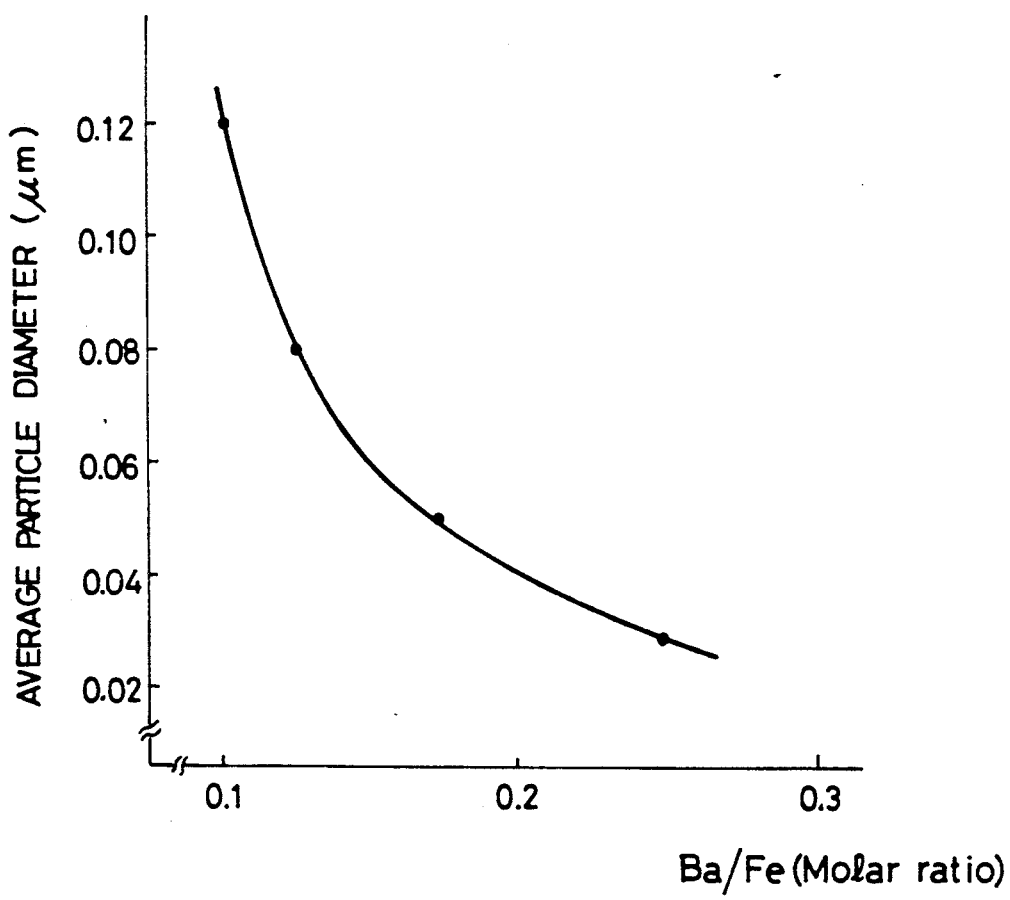
FIG. 1 shows the relationship between the ratio (molar ratio) of Ba added to $Fe^{3+}$ and the particle size of the plate-like composite ferrite containing Ba fine particles produced.

FIG. 1 shows the relationship between the ratio (molar ratio) of Ba added to $Fe^{3+}$ and the particle size (average particle diameter of the plate-like composite ferrite containing Ba fine particles produced by adding Ti of 3 atomic % based on $Fe^{3+}$ and Ni in the ratio of Ni/Ti=3 (molar ratio) and carrying out reaction under the conditions of Example 1 which will be described later. As is clear from FIG. 1, when the ratio of Ba added to $Fe^{3+}$ is not less than 0.125, the plate-like composite ferrite containing Ba fine particles produced have a particle size of not more than 0.08 μm, and has a tendency to become finer as the ratio of Ba added to $Fe^{3+}$ is increased.

A method of adding an Ni compound and a Ti compound when producing plate-like ferrite containing Ba particles by autoclaving method is conventionally known, as described in, for example, Japanese Patent Application Laid-Open (KOKAI) No. 56-149328 (1981).

This method, however, is aimed at reducing the coercive force by adjusting the valence of an $Fe^{3+}$ ions and the valence of an additive to be equal and, hence, it is necessary that the amounts of Ni compound and Ti compound added are equivalents. Therefore, this method is quite different in the technical means, object and advantages from the present invention which aims at controlling the particle size of the plate-like Ba ferrite containing fine particles produced and in which the amount of Ni compound added is different from the amount of Ti compound added.

In the present invention, it is possible to effectively increase the magnetization of the plate-like composite ferrite containing Ba particles at a heat-treatment temperature of not higher than 900° C. and lower the coercive force by bringing zinc in the vicinity of the particle surfaces in the form of a solid solution into existence.

Accordingly, it is possible to effectively and appropriately control the coercive force while maintaining a large magentization even if using an element having a small coercive force reducing-effect such as $Ni^{2+}$—$Ti^{4+}$.

I. Plate-like composite Ba ferrite containing Ba fine particles are obtained by autoclaving a a suspension of an alkaline iron (III) hydroxide containing Ba ions in the temperature range of 100° to 300° C., in which the amount of Ba ions added is in the range of 0.125 to 0.25 atom based on 1 atom of $Fe^{3+}$, while adding in advance 2 to 5.0 atomic%, preferably 2.5 to 4.5 atomic% of a Ti compound based on $Fe^{3+}$ and $1.2 \leq Ni/Ti \leq 4$ by molar ratio, preferably $1.5 \leq Ni/Ti \leq 3.0$ by molar ratio of an Ni compound to the suspension of the alkaline iron (III) hydroxide so as to produce the plate-like composite ferrite containing Ba fine particles having a particle size corresponding to the amount of Ba ions added in the range of an average particle diameter of 0.01 μm to 0.08 μm, preferably 0.01 to 0.06μm, suspending the thus obtained fine particles in an aqueous solution containing zinc and having a pH of 4.0 to 12.0, filtering out the fine particles with a Zn hydroxide precipitated on the surfaces thereof, washing them with water, drying them and heat-treating the thus obtained fine particles in the temperature range of 600° to 900° C. The temperature dependence of the coercive force of the thus obtained plate-like composite Ba ferrite fine particles containing Ti of 2 to 5.0 atomic%, preferably 2.5 to 4.5 atomic% based on $Fe^{3+}$ and Ni in the range of $1.2 \leq Ni/Ti \leq 4$ by molar ratio, preferably $1.5 \leq Ni/Ti \leq 3.0$ by molar ratio, having zinc in the vicinity of the particle surfaces in the form of a solid solution and having an average particle diameter of 0.01 μm to 0.08 μm, preferably 0.01 to 0.06 μm is $-0.5$ Oe/° C. to $+0.5$ Oe/° C. in the temperature range of $-20°$ C. to 120° C. The coercive force (Hc) thereof is 300 to 2,500 Oe, preferably 500 to 2,000 Oe and the magnetization (σs) is not less than 50 emu/g, preferably not less than 55 emu/g. The anisotropy field (Hk) thereof is not less than 3.5 KOe, preferably not less than 3.8 KOe, more preferably not less than 4.0 KOe.

II. Plate-like composite ferrite containing fine particles are obtained by autoclaving a suspension of an alkaline iron (III) hydroxide containing Ba ions in a temperature range of 100° to 300° C., in which the amount of Ba ions added is in the range of 0.125 to 0.25 atom based on 1 atom of $Fe^{3+}$, while adding in advance 2 to 5.0 atomic%, preferably 2.5 to 4.5 atomic% of a Ti compound based on $Fe^{3+}$ and $1.2 \leq Ni/Ti \leq 4$ by molar ratio, preferably $1.5 \leq Ni/Ti \leq 3.0$ by molar ratio of an Ni compound to the suspension of the alkaline iron (III) hydroxide so as to produce the plate-like composite ferrite containing Ba fine particles having a particle size corresponding to the amount of Ba ions added in the range of an average particle diameter of 0.01 μm to 0.08 μm, preferably 0.01 to 0.06 μm suspending the thus obtained fine particles in an aqueous solution containing zinc and having a pH of 4.0 to 12.0, filtering out the fine particles with a Zn hydroxide precipitated on the surfaces thereof, washing them with water, drying them and heat-treating the thus obtained fine particles in the temperature range of 600° to 900° C., thereby Obtaining plate-like composite Ba ferrite containing Ba fine particles containing Ti of 2 to 5.0 atomic%, preferably 2.5 to 4.5 atomic% based on $Fe^{3+}$ and Ni in the range of $1.2 \leq Ni/Ti \leq 4$ by molar ratio, preferably $1.5 \leq Ni/Ti \leq 3.0$ by molar ratio and having zinc in the vicinity of the particle surfaces in the form of a solid solution, mixing the thus obtained fine particles with an alkaline suspension containing an $Fe^{2+}$ salt, at least one metal salt selected from the group consisting of $Co^{2+}$, $Ni^{2+}$, $Mn^{2+}$, $Mg^{2+}$ and $Zn^{2+}$, or both the $Fe^{2+}$ salt and the metal salt in the ratio of 1.0 to 35.0 atomic% based on the total amount of Fe (III), Ni and Ti in the particles and having a pH of 8.0 to 14.0, and heat-treating the resultant mixture in the temperature range of 50 to 100° C., thereby obtaining plate-like composite ferrite containing Ba fine particles containing Ti of 2 to 5 atomic%, preferably 2.5 to 4.5 atomic% based on $Fe^{3+}$ and Ni in the range of $1.2 \leq Ni/Ti \leq 4$ by molar ratio, preferably $1.5 \leq Ni/Ti \leq 3.0$ by molar ratio, having zinc in the vicinity of the particle surfaces in the form of a solid solution, having the surfaces coated with a spinel type oxide ($M^{2+}_x Fe^{2+}_y O \cdot Fe_2 O_3$, wherein $M^{2+}$ represents at least one metal selected from the group consisting of $Co^{2+}$, $Ni^{2+}$, $Mn^{2+}$, $Mg^{2+}$ and $Zn^{2+}$, $0 \leq x \leq 1$, $0 \leq y \leq 1$, $0 < x+y \leq 1$), and having an average particle diameter of 0.01 μm to 0.08 μm, preferably 0.01 to 0.06 μm. The temperature dependence of the coercive force of these particles in the temperature range of $-20°$ C. to 120° C. is $-3.0$ Oe/° C. to $+0.5$ Oe/° C. The coercive force (Hc) thereof is 300 to 2,500 Oe, preferably 500 to 2,000 Oe, more preferably 500 to 1,500 Oe and the magnetization (σs) is not less than 55 emu/g, preferably not less than 58 emu/g, and the anisotropy field (Hk) is not less than 3.5 KOe.

When plate-like composite Ba ferrite containing Ba particles are coated with a spinel type oxide, the anisotropy field thereof is generally reduced. However, the plate-like composite ferrite containing Ba particles having zinc in the vicinity of the particle surfaces in the form of a solid solution and containing Ni and Ti according to the present invention have a large anisotropy field. The reason for this is not clear, but the present inventor considers that it is due to the synergistic effect of using specific plate-like composite ferrite containing Ba particles as the treated particles and coating the particles with a spinel type oxide.

The reason why the plate-like composite ferrite containing Ba fine particles having the temperature dependence of the coercive force in the range of $-0.5$ Oe/° C. to $+0.5$ Oe/° C. or $-3.0$ Oe/° C. to $+0.5$ Oe/° C. are obtained is not clear. The present inventor considers that it is due to the synergistic effect of Ni and Ti which substitute a part of $Fe^{3+}$ in the plate-like composite ferrite containing Ba produced from an aqueous solution, and zinc existing in the vicinity of the particle surfaces in the form of a solid solution, because a temperature stability in the range of $-0.5$ Oe/° C. to $+0.5$ Oe/° C. or $-3.0$ Oe/° C. to $+0.5$ Oe/° C. is not obtained in either case of plate-like composite ferrite containing Ba fine particles containing Ni and Ti but not having zinc in the vicinity of the particle surfaces in the form of a solid solution and plate-like composite ferrite containing Ba fine particles having zinc in the vicinity of the particle surfaces in the form of a solid solution but not containing Ni and Ti.

As the $Fe^{3+}$ salt in the present invention, iron nitrate, iron chloride, etc. are usable.

As the Ba ions in the present invention, barium hydroxide, barium chloride, barium nitrate and the like are usable.

The amount of Ba ion added is 0.125 to 0.25 atom based on 1 atom of $Fe^{3+}$. If it is less than 0.125 atom, the average particle diameter of the plate-like composite ferrite containing Ba particles produced is more than 0.08 μm. Even if it is more than 0.25 atom, the fine particles having a particle size of less than 0.08μm are produced, but the magnetization of the particles obtained by heat treating the fine particles is so small that it is difficult to obtain magnetic particles for magnetic recording of the present invention.

As the Ti compound in the present invention, titanium tetrachloride, titanyl sulfate, titanium sulfide and the like are usable.

The amount of Ti compound added is 2 to 5.0 atomic%, preferably 2.5 to 4.5 atomic% based on $Fe^{3+}$. If it is less than 2 atomic%, it is difficult to control the coercive force of the plate-like composite ferrite containing Ba particles obtained. If it exceeds 5.0 atomic%, the plate-like composite ferrite containing Ba particles disadvantageously include $BaTiO_3$.

The reaction temperature in the present invention is 100° to 300° C. If the temperature is lower than 100° C., it is difficult to produce plate-like composite ferrite containing Ba particles. On the other hand, if the temperature exceeds 300° C., the average particle diameter of the plate-like composite ferrite containing Ba particles produced is more than 0.08 μm.

As the Ni compound in the present invention, nickel chloride, nickel nitrate, nickel acetate and the like are usable.

The amount of Ni compound added is in the range of $1.2 \leq Ni/Ti \leq 4$ by molar ratio, preferably $1.5 \leq Ni/Ti \leq 3.0$ by molar ratio.

If Ni/Ti ratio is not more than 1.2 by molar ratio, the average particle diameter of the plate-like composite ferrite containing Ba particles produced is more than 0.08 μm. Even if Ni/Ti ratio is more than 4 by molar ratio, the plate-like composite ferrite containing Ba particles having an appropriate coercive force which is an object of the present invention can be obtained but it is meaningless to add an Ni compound more than necessary.

In order to precipitate a Zn hydroxide in the present invention, plate-like composite ferrite containing Ba fine particles are suspended in an aqueous solution containing zinc and having a pH of 4.0 to 12.0.

As an aqueous solution containing zinc, zinc halides such as zinc chloride, zinc bromide and zinc iodide and zinc nitrate, zinc sulfate, zinc acetate, etc. are usable.

If the pH is less than 4 or more than 12, precipitation of zinc becomes difficult.

The heat-treatment temperature in the present invention is 600° to 900° C.

If it is lower than 600° C., the amount of zinc solid solution on the particle surfaces of the plate-like composite ferrite containing Ba particles is insufficient.

If it exceeds 900° C., the sintering between the particles becomes prominent.

Prior to heat-treatment in the present invention, the particle surfaces of the plate-like composite ferrite containing Ba fine particles may be coated in advance with an Si compound, A( compound, P compound or the like which has a sintering preventing effect.

A known flux may be used for heat-treatment. As the flux, at least one selected from the group consisting of a halide of an alkali metal, a halide of an alkali earth metal, a sulfate of an alkali and a sulfate of an alkali earth metal is usable.

The amount of flux used is 3 to 400 wt% based on the fine particles heat-treated. If it is less than 3 wt%, particles are unfavorably sintered between each other during heat-treatment. Addition of more than 400 wt% of a flux can also achieve the object of the present invention, but it is meaningless to add a flux more than necessary.

The flux is washed with at least one selected from the group consisting of water and an aqueous acid solution such as hydrochloric acid, acetic acid and nitric acid.

In the plate-like composite ferrite containing Ba particles according to the present invention, Zn exists in the vicinity of particle surface thereof in the form of a solid solution, having a concentration gradient of Zn with 0.2 to 5.0 wt% (calculated as Zn) through the particle.

If it is less than 0.2 wt%, the object of the present invention cannot be achieved sufficiently.

Even if it exceeds 5.0 wt%, the object of the present invention is achieved, but it is meaningless to add zinc more than necessary.

Coating with a spinel type oxide in the present invention is carried out by mixing the plate-like composite ferrite containing Ba particles, which are an object of being treated, with an alkaline suspension containing an $Fe^{2+}$ salt, a metal $M^{2+}$ salt other than $Fe^{2+}$ or both $Fe^{2+}$ salt and metal $M^{2+}$ salt.

As the $Fe^{2+}$ salt, ferrous sulfate, ferrous chloride, ferrous nitrate and the like are usable.

As the metal $M^{2+}$ salt, chlorides, nitrates and sulfates, etc. of at least one metal selected from the group consisting of $Co^{2+}$, $Ni^{2+}$, $Mn^{2+}$, $Mg^{2+}$ and $Zn^{2+}$ are usable.

The amount of $Fe^{2+}$ salt, metal $M^{2+}$ salt or both $Fe^{2+}$ metal and metal $M^{2+}$ salt is 1.0 to 35.0 atomic% based on the total amount of $Fe^{3+}$ and Ni and Ti in the plate-like composite ferrite containing Ba fine particles.

If it is less than 1.0 atomic%, the coating effect of the spinel type oxide is insufficient and it is difficult to obtain plate-like composite ferrite containing Ba fine particles having both an enhanced magnetization and a large anisotropy field. If it exceeds 35.0 atomic%, the spinel type oxide is unfavorably separated out singly.

The mixing order of plate-like composite ferrite containing Ba fine particles and an alkaline suspension containing an $Fe^{2+}$ salt, a metal $M^{2+}$ salt or both $Fe^{2+}$ salt and metal $M^{2+}$ salt is not specified; either may be added to the other or both may be mixed with each other simultaneously.

The pH of the alkaline suspension is 8.0 to 14.0. If the pH is less than 8.0, the suspension is unsuitable for a hydroxide of $Fe^{2+}$, metal $M^{2+}$ or both $Fe^{2+}$ and metal $M^{2+}$ to exist in a stable state. Since a hydroxide of $Fe^{2+}$, metal $M^{2+}$ or both $Fe^{2+}$ and metal $M^{2+}$ exists in a stable state and a reaction for producing a spinel type oxide from such a hydroxide arises so long as the suspension is strong alkaline, a pH of not more than 14.0 is sufficient for achieving the object of the present invention in consideration of the industrial and economical efficiency.

The heating temperature in the present invention is 50° to 100° C. If it is lower than 50° C., it is difficult to react for producing a spinel type oxide from a hydroxide of $Fe^{2+}$, metal or both $Fe^{2+}$ and metal $M^{2+}$ in the present invention. Although the spinel type oxide production reaction arises even at a temperature higher than 100° C., the temperature of 100° C. is sufficient for achieving the object of the present invention because the reaction is carried out in an aqueous solution.

The plate-like composite ferrite containing Ba fine particles according to the present invention have a particles size of not more than 0.08 μm, a large magnetization, an appropriate coercive force and a large anisotropy field, and the coercive force thereof scarcely varies with respect to temperature or has a tendency of lowering with the rise of temperature. Thus, the plate-like composite ferrite containing Ba particles according to the present invention are highly suitable as plate like composite ferrite particles for magnetic recording which are now in the strongest demand.

Particularly, since the temperature dependence of the coercive force of these particles in the temperature range of $-20°$ C. to $120°$ C. is $-3.0$ Oe/$°$ C. to $+0.5$ Oe/$°$ C., these particles are highly suitable as plate like composite ferrite particles for magnetic recording.

Furthermore, in the plate-like composite ferrite containing Ba fine particles of the present invention, the electric resistance has a tendency of lowering due to the spinel type oxide with which the particle surfaces are coated, so that the reduction in the amount of carbon, facilitation of dispersibility and the like are expected in the production of a magnetic coating.

EXAMPLES

The present invention will be explained with reference to the following examples and comparative examples.

In the following examples and comparative examples, the average particle diameter is a value obtained from an electron micrograph.

The magnetization and the coercive force were measured in a magnetic field of 10 KOe in the powder state.

The temperature stability (Oe/$°$ C.) was represented by the value obtained by dividing the difference between the coercive force at $120°$ C. and the coercive force at $-20°$ C. by the temperature difference between $120°$ C. and $-20°$ C., namely, $140°$ C.

An anisotropy field (Hk) is represented by the value obtained by a method described on from line 21 on the left to line 10 on the right of page 3433 of JOURNAL OF APPLIED PHYSICS vol. 63, No. 8 (1988).

That is, coordinates (ordinate: Wr, abscissa: 1/H) were produced by plotting the value of energy loss (Wr) [Rotational Hysteresis Loss] obtained from the torque curve which is obtained when a sample is rotated by $360°$ by using a torque magnetometer (Model 1600, produced by DIGITAL MEASUREMENT SYSTEM, INC.) with respect to the reciprocal: 1/H of the magnetic field (H). The inclined portion of the curve which has the largest inclination to the abscissa was taken out and the value of the point at which the extension of the inclined portion crosses the abscissa:1/H was assumed to be the anisotropy field (Hk).

Each sample was produced by applying a kneaded mixture of plate-like composite ferrite containing Ba particles and an epoxy resin to paper.

Production of Plate-like Composite Ferrite Containing Ba Fine Particles from Aqueous Solution Examples 1 to 12, Comparative Examples 1 to 3

Example 1

An alkaline suspension of 14 mol of $FeCl_3$, 1.26 mol (equivalent to Ni/Ti=3 by molar ratio) of $NiCl_2$, 0.42 mol (equivalent to 3 atomic% based on $Fe_{3+}$) of $TiCl_4$, 2.33 mol (equivalent to 0.166 atomic% based on 1 atom of $Fe_{3+}$) of $BaCl_2$ and 171 mol of NaOH was heated to $200°$ C. in an autoclave and maintained at $200°$ C. for 3 hours while being mechanically stirred, thereby producing a brown ferromagnetic precipitate.

After the autoclave was cooled to room temperature, the brown ferromagnetic precipitate was filtered out, thoroughly washed with water, and dried.

The thus obtained brown ferromagnetic particles turned out to be plate-like particles having an average particle diameter of 0.05 $\mu$m from the observation through an electron microscope. Through X-ray fluorometry, it was found that the particles were composite ferrite containing Ba particles containing 9.0 atomic% of Ni and 3.0 atomic% of Ti based on $Fe^{3+}$.

Examples 2 to 12, Comparative Examples 1, 3

Plate-like composite ferrite containing Ba fine particles were obtained in the same way as in Example 1 except for varying the kind of an aqueous ferric salt solution, the kind and the amount of an aqueous Ba salt solution, the kind and the amount of Ni compound, the kind and the amount of Ti compound, and the reaction temperature and time.

The main production conditions and the properties of the products are shown in Table 1.

Figure 2:
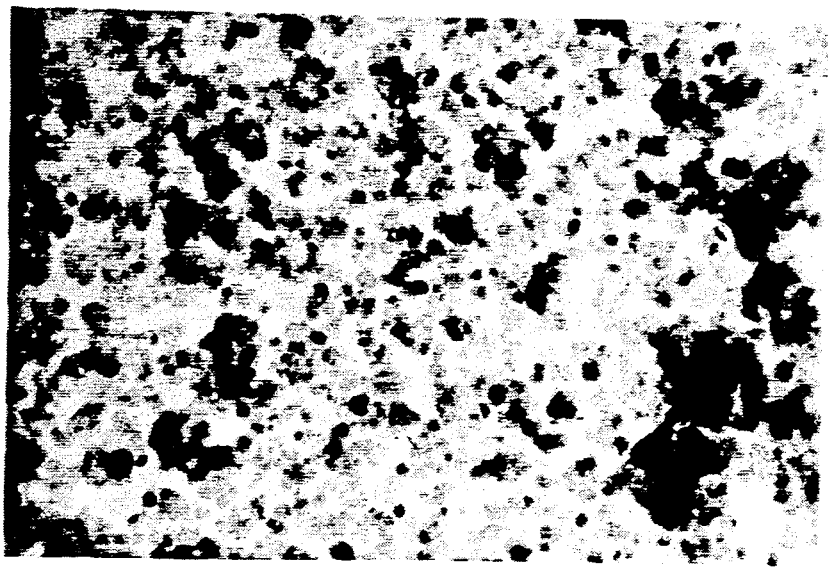
Figure 3:
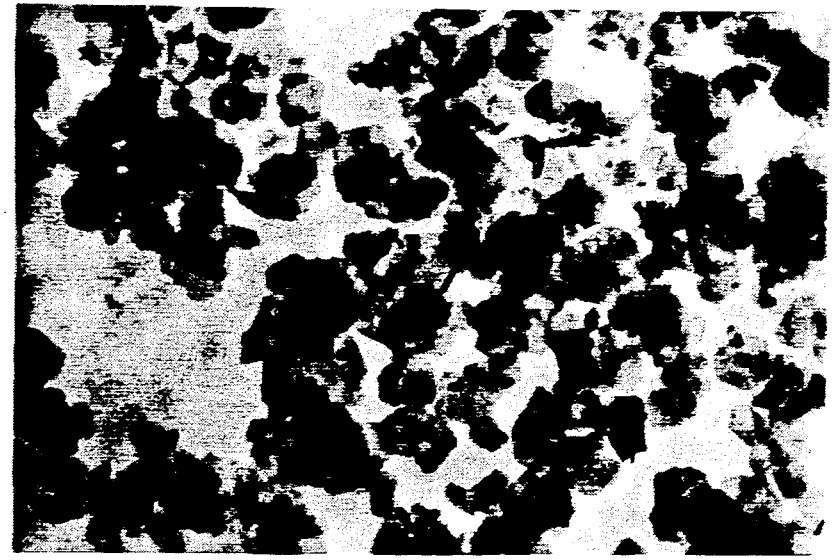
Figure 4:

The electron micrographs ($\times 100,000$) of the plate-like composite ferrite containing Ba fine particles obtained in Examples 2, 3 and Comparative Example 3 are shown in FIGS. 2 to 4, respectively.

Comparative Example 2

Particles were produced in the same way as in Example 1 except that the amount of $TiCl_4$ was 5.5 atomic% based on $Fe^{3+}$.

Figure 5:
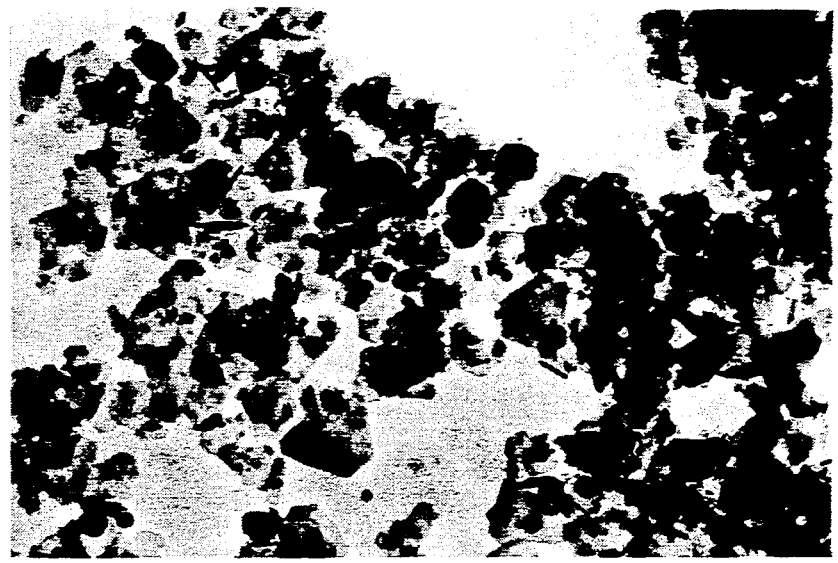

The particles obtained were mixed particles of plate-like particles and cubic particles, as is clear from the electron micrograph ($\times 100,000$) in FIG. 5, and a peak showing a magneto plumbite and a peak showing $BaTiO_3$ were observed in the X-ray diffraction pattern.

Production of Plate-like Composite Ferrite Containing Ba Fine Particles by Heat Treating Examples 13 to 24, Comparative Examples 4 to 6

Example 13

100 g of the plate-like composite ferrite containing Ba particles containing Ni and Ti obtained in Example 1 were dispersed in 0.06 mol of an aqueous zinc chloride solution and a Zn hydroxide was precipitated on the particle surfaces at pH 9, which were filtered out, dried and then heat-treated at $850°$ C. for 1.5 hours.

The thus obtained heat-treated particles are plate-like particles having an average particles diameter of 0.05 $\mu$m from the observation through an electron microscope. As to the magnetic properties, the coercive force (Hc) was 1,050 Oe, the magnetization was 57.0 emu/g and the temperature dependence of the coercive force was $+0.4$ Oe/$°$ C. Through X-ray fluorometry, it was found that the particles contained 9.0 atomic% of Ni, 3.0 atomic% of Ti based on Fe and 3.2 wt% of Zn.

When these fine particles are chemically analyzed, no zinc oxide or zinc hydroxide that was to be extracted under heating in an aqueous alkaline solution was detected. As a result, it was observed that zinc had dissolved in the form of a solid solution.

Examples 14 to 24, Comparative Examples 4 to 6

Plate-like composite ferrite containing Ba fine particles were obtained in the same way as in Example 13 except for varying the kind and the amount of Zn compound, the heat-treating temperature and time, and the kind and amount of flux, if any.

The main production conditions and the properties of the products are shown in Table 2.

Example 25

100 g of the plate-like composite ferrite containing Ba fine particles containing Ni and Ti and having zinc in the vicinity of the particles surfaces in the form of a solid solution which had been obtained in Example 13 and an alkaline suspension containing 0.37 mol of Fe$(OH)_2$ and 0.041 mol of $Co(OH)_2$ were mixed with each other (the total amount of $Fe^{2+}$ and $Co^{2+}$ was equivalent to 34.3 atomic% based on the total amount of $Fe^{3+}$, Ni and Ti), and the total volume of the mixed suspension was adjusted to 2.0 l by adding water. The resultant mixed suspension having a pH of 12.0 was then heated to 80° C. and stirred at 80° C. for 1.0 hour, thereby producing a black brown precipitate. The black brown precipitate was filtered out, washed with water, treated with acetone and dried at room temperature.

The black brown particles obtained had an average particle diameter of 0.05 μm according to the observation through an electron microscope. In the X-ray diffraction pattern, a peak of Ba ferrite and a peak of spinel ferrite was observed.

As to the magnetic properties of the black brown particles, the coercive force (Hc) was 750 Oe, the magnetization (σs) was 65.2 emu/g, the temperature dependence of the coercive force was $-1.0$ Oe/° C. and the anisotropy field (Hk) was 3.8 KOe.

Example 26

100 g of the plate-like composite ferrite containing Ba fine particles containing Ni and Ti and having zinc in the vicinity of the particle surfaces in the form of a solid solution which had been obtained in Example 15 and an alkaline suspension containing 0.11 mol of $Fe(OH)_2$ were mixed with each other (the amount of $Fe^{2+}$ was equivalent to 9.2 atomic% based on the total amount of $Fe^{3+}$, Ni and Ti), and the total volume of the mixed suspension was adjusted to 2.0 l by adding water. The resultant mixed suspension having a pH of 12.5 was then heated to 90° C. and stirred at 90° C. for 1.0 hour, thereby producing a black brown precipitate. The black brown precipitate was filtered out, washed with water, treated with acetone and dried at room temperature.

The black brown particles obtained had an average particle diameter of 0.08 μm according to the observation through an electron microscope. In the X-ray diffraction pattern, a peak of Ba ferrite and a peak of spinel ferrite was observed.

As to the magnetic properties of the black brown particles, the coercive force (Hc) was 960 Oe, the magnetization (σs) was 61.3 emu/g, the temperature dependence of the coercive force was $-1.9$ Oe/° C. and the anisotropy field (Hk) was 3.7 KOe.

Example 27

100 g of the plate-like composite ferrite containing Ba fine particles containing Ni and Ti and having zinc in the vicinity of the particle surfaces in the form of a solid solution which had been obtained in Example 22 and an alkaline suspension containing 0.22 mol of $Fe(OH)_2$, 0.017 mol of $Co(OH)_2$ and 0.007 mol of $Zn(OH)_2$ were mixed with each other (the total amount of $Fe^{2+}$, $Co^{2+}$ and $Zn^{2+}$ was equivalent to 20.3 atomic% based on the total amount of $Fe^{3+}$, Ni and Ti), and the total volume of the mixed suspension was adjusted to 2.0 l by adding water. The resultant mixed suspension having a pH of 12.0 was then heated to 90° C. and stirred at 90° C. for 1.0 hour, thereby producing a black brown precipitate. The black brown precipitate was filtered out, washed with water, treated with acetone and dried at room temperature.

The black brown particles obtained had an average particle diameter of 0.05 μm according to the observation through an electron microscope. In the X-ray diffraction pattern, a peak of Ba ferrite and a peak of spinel ferrite was observed.

As to the magnetic properties of the black brown particles, the coercive force (Hc) was 690 Oe, the magnetization (σs) was 63.8 emu/g, the temperature dependence of the coercive force was $-2.4$ Oe/° C. and the anisotropy field (Hk) was 3.9 KOe.

Example 28

100 g of the plate-like composite ferrite containing Ba fine particles containing Ni and Ti and having zinc in the vicinity of the particle surfaces in the form of a solid solution which had been obtained in Example 18 and an alkaline suspension containing 0.29 mol of $Fe(OH)_2$ and 0.072 mol of $Mn(OH)_2$ were mixed with each other (the total amount of $Fe^{2+}$ and $Mn^{2+}$ was equivalent to 30.2 atomic% based on the total amount of $Fe^{3+}$, Ni and Ti), and the total volume of the mixed suspension was adjusted to 2.0 l by adding water. The resultant mixed suspension having a pH of 11.5 was then heated to 85° C. and stirred at 85° C. for 1.5 hour, thereby producing a black brown precipitate. The black brown precipitate was filtered out, washed with water, treated with acetone and dried at room temperature.

The black brown particles obtained had an average particle diameter of 0.03 μm according to the observation through an electron microscope. In the X-ray diffraction pattern, a peak of Ba ferrite and a peak of spinel ferrite was observed.

As to the magnetic properties of the black brown particles, the coercive force (Hc) was 610 Oe, the magnetization (σs) was 64.2 emu/g, the temperature dependence of the coercive force was $-0.8$ Oe/° C. and the anisotropy field (Hk) was 3.7 KOe.

TABLE 1

| | Production of Plate-like Composite Ferrite Containing Ba Fine Particles From Aqueous Solution | | | | | | |
|---|---|---|---|---|---|---|---|
| Examples and Comparative Examples | Aqueous Ferric Salt Solution Kind | Aqueous Ba Salt Solution | | Ba/Fe (Atom) | Ni Compound | | Ni/Fe (Atomic %) |
| | | Kind | Amount (mol) | | Kind | Amount (mol) | |
| Example 1 | $FeCl_3$ | $BaCl_2$ | 2.33 | 0.166 | $NiCl_2$ | 1.26 | 9 |
| Example 2 | " | " | 3.5 | 0.25 | " | 1.26 | 9 |
| Example 3 | " | " | 1.75 | 0.125 | " | 1.26 | 9 |
| Example 4 | " | " | 2.33 | 0.166 | " | 1.12 | 8 |
| Example 5 | " | " | 2.33 | 0.166 | " | 0.84 | 6 |
| Example 6 | $Fe(NO_3)_3$ | $Ba(OH)_2$ | 1.75 | 0.125 | " | 1.26 | 9 |
| Example 7 | " | $Ba(NO_3)_2$ | 1.75 | 0.125 | " | 1.26 | 9 |
| Example 8 | $FeCl_3$ | $BaCl_2$ | 2.33 | 0.16 | $Ni(NO_3)_2$ | 1.68 | 12 |
| Example 9 | $Fe(NO_3)_3$ | $Ba(NO_3)_2$ | 1.75 | 0.125 | $NiCl_2$ | 0.63 | 4.5 |
| Example 10 | $FeCl_3$ | $BaCl_2$ | 2.33 | 0.166 | $Ni(NO_3)_2$ | 1.12 | 8 |
| Example 11 | " | " | 2.33 | 0.166 | $NiCl_2$ | 0.84 | 6 |
| Example 12 | $Fe(NO_3)_3$ | $Ba(NO_3)_2$ | 1.75 | 0.125 | $Ni(NO_3)_2$ | 1.26 | 9 |

TABLE 1-continued

| | | | | | | | | |
|---|---|---|---|---|---|---|---|---|
| Comparative Example 1 | FeCl₃ | BaCl₂ | 7.0 | 0.5 | NiCl₂ | 1.26 | 9 | |
| Comparative Example 2 | " | " | 2.33 | 0.166 | " | 1.26 | 9 | |
| Comparative Example 3 | " | " | 1.4 | 0.1 | " | 1.26 | 9 | |

| | Production of Plate-like Composite Ferrite Containing Ba Fine Particles From Aqueous Solution | | | | | Plate-like Composite Ferrite Containing Ba Fine Particles | | |
|---|---|---|---|---|---|---|---|---|
| Examples and Comparative Examples | Ti Compound | | | | | Ni/Fe Content (Atomic %) | Ti/Fe Content (Atomic %) | Average Diameter (μm) |
| | Kind | Amount (mol) | Ti/Fe (Atomic %) | Ni/Ti (Molar Ratio) | Temperature (°C.) | Time (Hour) | | | |
| Example 1 | TiCl₄ | 0.42 | 3 | 3 | 200 | 3.0 | 9 | 3 | 0.05 |
| Example 2 | " | 0.42 | 3 | 3 | 200 | 3.0 | 9 | 3 | 0.03 |
| Example 3 | " | 0.42 | 3 | 3 | 200 | 3.0 | 9 | 3 | 0.08 |
| Example 4 | " | 0.56 | 4 | 2 | 250 | 3.0 | 8 | 4 | 0.05 |
| Example 5 | " | 0.56 | 4 | 1.5 | 200 | 3.0 | 6 | 4 | 0.05 |
| Example 6 | " | 0.42 | 3 | 3 | 120 | 3.0 | 9 | 3 | 0.03 |
| Example 7 | " | 0.42 | 3 | 3 | 160 | 3.0 | 9 | 3 | 0.05 |
| Example 8 | TiS₂ | 0.42 | 3 | 4 | 200 | 3.0 | 12 | 3 | 0.04 |
| Example 9 | TiCl₄ | 0.42 | 3 | 1.5 | 160 | 3.0 | 4.5 | 3 | 0.05 |
| Example 10 | TiOSO₄ | 0.56 | 4 | 2 | 250 | 3.0 | 8 | 4 | 0.05 |
| Example 11 | " | 0.56 | 4 | 1.5 | 200 | 3.0 | 6 | 4 | 0.05 |
| Example 12 | TiCl₄ | 0.42 | 3 | 3 | 160 | 3.0 | 9 | 3 | 0.05 |
| Comparative Example 1 | TiCl₄ | 0.42 | 3 | 3 | 200 | 3.0 | 9 | 3 | 0.01 |
| Comparative Example 2 | " | 0.77 | 5.5 | 1.64 | 200 | 3.0 | — | — | — |
| Comparative Example 3 | " | 1.26 | 9 | 1 | 200 | 3.0 | 9 | 9 | 0.12 |

TABLE 2

| Examples and Comparative Examples | Starting Materials (Example No. and Comparative Example No.) | Zn Solid-Solution Treatment | | | | | |
|---|---|---|---|---|---|---|---|
| | | Zn Added | | Heat-treatment Temperature (°C.) | Time (Hour) | Flux | |
| | | Kind | Amount (mol) | | | Kind | Amount (g) |
| Example 13 | Example 1 | ZnCl₂ | 0.06 | 850 | 1.5 | NaCl | 100 |
| Example 14 | Example 2 | " | 0.05 | 850 | 1.5 | " | " |
| Example 15 | Example 3 | " | 0.07 | 850 | 1.5 | " | " |
| Example 16 | Example 4 | Zn(OH)₂ | 0.06 | 900 | 1.0 | BaCl₂ | " |
| Example 17 | Example 5 | Zn(NO₃)₂ | 0.04 | 800 | 2.0 | KCl | 150 |
| Example 18 | Example 6 | (CH₃COO)₂Zn | 0.08 | 750 | 3.0 | NaCl,KCl | 80, 20 |
| Example 19 | Example 7 | Zn(NO₃)₂ | 0.10 | 850 | 1.5 | — | — |
| Example 20 | Example 8 | ZnCl₂ | 0.07 | 850 | 1.5 | BaCl₂ | 100 |
| Example 21 | Example 9 | Zn(OH)₂ | 0.02 | 900 | 1.5 | " | 100 |
| Example 22 | Example 10 | " | 0.06 | 900 | 1.0 | BaCl₂ | 100 |
| Example 23 | Example 11 | Zn(NO₃)₂ | 0.04 | 800 | 2.0 | KCl | 150 |
| Example 24 | Example 12 | " | 0.10 | 850 | 1.5 | — | — |
| Comparative Example 4 | Example 1 | — | — | 850 | 1.5 | NaCl | 100 |
| Comparative Example 5 | Comparative Example 1 | ZnCl₂ | 0.06 | 850 | 1.5 | NaCl | 100 |
| Comparative Example 6 | Comparative Example 3 | Zn(NO₃)₂ | 0.06 | 850 | 1.5 | — | — |

| Examples and Comparative Examples | Starting Materials (Example No. and Comparative Example No.) | Plate-like Composite Ferrite Containing Ba Fine Particles | | | | | |
|---|---|---|---|---|---|---|---|
| | | Average Diameter (μm) | Coercive Force (Hc) (Oe) | Magnetization (σs) (emu/g) | Temperature Stability (Oe/°C.) | Amount of Zn Solid Solution (wt %) | Anisotropy field (Hk) (KOe) |
| Example 13 | Example 1 | 0.05 | 1050 | 57.0 | +0.4 | 3.2 | 4.5 |
| Example 14 | Example 2 | 0.03 | 880 | 58.7 | +0.4 | 2.8 | 4.2 |
| Example 15 | Example 3 | 0.08 | 1190 | 58.2 | −0.1 | 3.8 | 4.5 |
| Example 16 | Example 4 | 0.05 | 890 | 58.0 | −0.2 | 3.3 | 4.3 |
| Example 17 | Example 5 | 0.05 | 970 | 56.3 | +0.3 | 2.2 | 4.4 |
| Example 18 | Example 6 | 0.03 | 1000 | 57.5 | +0.2 | 4.3 | 4.5 |
| Example 19 | Example 7 | 0.05 | 830 | 56.3 | ±0.0 | 5.0 | 4.1 |
| Example 20 | Example 8 | 0.04 | 760 | 57.0 | −0.3 | 3.8 | 4.0 |
| Example 21 | Example 9 | 0.05 | 1730 | 58.5 | +0.2 | 1.1 | 4.9 |
| Example 22 | Example 10 | 0.05 | 900 | 57.8 | −0.2 | 3.3 | 4.2 |
| Example 23 | Example 11 | 0.05 | 960 | 56.0 | +0.3 | 2.2 | 4.5 |

TABLE 2-continued

| | | | | | | | |
|---|---|---|---|---|---|---|---|
| Example 24 | Example 12 | 0.05 | 810 | 56.3 | ±0.0 | 5.0 | 4.1 |
| Comparative Example 4 | Example 1 | 0.05 | 1450 | 50.3 | +1.5 | — | — |
| Comparative Example 5 | Comparative Example 1 | 0.03 | 170 | 36.8 | +0.2 | 3.2 | — |
| Comparative Example 6 | Comparative Example 3 | 0.12 | 600 | 54.3 | +0.2 | 3.3 | — |

What is claimed is:

1. Fine, plate-like Ba ferrite particles for magnetic recording consisting essentially of fine plate-like Ba ferrite particles which contain 2 to 5.0 atomic % Ti based on $Fe^{3+}$ and Ni in the range of $1.2 \leq Ni/Ti \leq 4$ by molar ratio, which have 0.2 to 5.0 wt % of zinc as a solid solution close to the particle surfaces and which have an average particle diameter of 0.01 μm to 0.08 μm, an anisotropy field (HK) of not less than 3.5 KOe, and a temperature dependence of coercive force in the range of −0.5 Oe/° C. to +0.5 Oe/° C. in the temperature range of −20° C. to 120° C.

2. Fine, plate-like Ba ferrite particles for magnetic recording according to claim 1, wherein said particles have an average particle diameter of 0.01 μm to 0.06 μm.

3. Fine, plate-like Ba ferrite particles for magnetic recording according to claim 1, wherein said particles have a coercive force (Hc) of 300 to 2,500 Oe and a magnetization (σs) of not less than 50 emu/g.

4. A process for producing fine, plate-like Ba ferrite particles according to claim 1, comprising the steps of:
   (a) autoclaving a suspension of an alkaline iron (III) hydroxide containing 0.125 to 0.25 atom of Ba ions based on 1 atom of $Fe^{3+}$ at a temperature in the range of 100 to 300° C. while adding in advance 2 to 5.0 atomic % of a Ti compound based on $Fe^{3+}$ and $1.2 \leq Ni/Ti \leq 4$ by molar ratio of an Ni compound to said suspension of said alkaline iron (III) hydroxide to produce fine, plate-like ferrite particle containing Ba having a particle size, corresponding to said amount of Ba ions added, in the range of an average particle diameter of 0.01 μm to 0.08 μm;
   (b) applying a coating of zinc hydroxide on the particles by suspending the thus obtained fine particles in a zinc containing aqueous solution and having a pH of 4.0 to 12.0;
   (c) filtering out said particles with zinc hydroxide precipitated on the surfaces thereof;
   (d) washing the obtained particles with water, and thereafter drying said particles; and
   (e) heat-treating said particles at the temperature of 600°–900° C.

5. Fine, plate-like Ba ferrite particles for magnetic recording consisting essentially of fine, plate-like Ba ferrite particles which contain 2 to 5.0 atomic % Ti based on $Fe^{3+}$ and Ni in the range of $1.2 \leq Ni/Ti \leq 4$ by molar ratio, which have 0.2 to 5.0 wt % of zinc as a solid solution close to the particle surfaces and which have an average particle diameter of 0.01 μm to 0.08 μm, an anisotropy field (HK) of not less than 3.5 KOe, and a temperature dependence of coercive force in the range of −3.0 Oe/° C. to +0.5 Oe/° C. in the temperature range of 31 20° C. is 120° C., wherein the surfaces of said particles are coated with a spinel oxide, $M^{2+}{}_xFe^{2+}{}_yO \cdot Fe_2O_3$, wherein $M^{2+}$ represents at least one metal selected from the group consisting of $Co^{2+}$, $Ni^{2+}$, $Mn^{2+}$, $Mg^{2+}$, and $Zn^{2+}$ and $0 \leq x \leq 1$, $0 \leq y \leq 1$, $0 < x+y \leq 1$.

6. Fine, plate-like Ba ferrite particles for magnetic recording according to claim 5, wherein said particles have an average particle diameter of 0.01 μm to 0.06 μm.

7. Fine, plate-like Ba ferrite particles for magnetic recording according to claim 5, wherein said particles have a coercive force (Hc) of 300 to 2,500 Oe and a magnetization (σs) of not less than 55 emu/g.

8. A process for producing fine, plate-like Ba ferrite particles according to claim 5, comprising the steps of:
   (a) autoclaving a suspension of an alkaline iron (III) hydroxide containing 0.125 to 0.25 atom of Ba irons based on 1 atom of $Fe^{3+}$ at a temperature in the range of 100° to 300° C. while adding in advance 2 to 5.0 atomic % of a Ti compound based on $Fe^{3+}$ and $1.2 \leq Ni/Ti \leq 4$ by molar ratio of an Ni compound to said suspension of said alkaline iron (III) hydroxide to produce fine, plate-like ferrite particles containing Ba having a particle size, corresponding to said amount of Ba ions added, in the range of an average particle diameter of 0.01 μm to 0.08 μm.
   (b) applying a coating of zinc hydroxide on the particles by suspending the thus obtained fine particles in a zinc containing aqueous solution and having a pH of 4.0 to 12.0;
   (c) filtering out said particles with a zinc hydroxide precipitated on the surfaces thereof;
   (d) washing the obtained particles with water, and drying said washed particles;
   (e) heat-treating said particles in the temperature range of 600 to 900° C.; and thereafter
   (f) mixing the obtained particles with an alkaline suspension containing an $Fe^{2+}$ salt, at least one metal salt selected from the group consisting of $Co^{2+}$, $Ni^{2+}$, $Mn^{2+}$, $Mg^{2+}$, and $Zn^{2+}$ or both said $Fe^{2+}$ salt and said metal salt, in the ratio of 1.0 to 35.0 atomic % based on the total amount of $Fe^{3+}$, Ni and Ti in said particles, said alkaline suspension having a pH of 8.0 to 14.0; and
   (g) heat treating the resultant mixture at the temperature range of 50° to 100° C.

* * * * *